United States Patent
An et al.

(10) Patent No.: US 10,067,813 B2
(45) Date of Patent: Sep. 4, 2018

(54) METHOD OF ANALYZING A FAULT OF AN ELECTRONIC SYSTEM

(71) Applicant: Samsung Electronics Co., Ltd., Suwon-si, Gyeonggi-do (KR)

(72) Inventors: Jang-Hyuk An, Yongin-si (KR); Byoung-Ju Choi, Seoul (KR); Ji-Hyun Park, Goyang-si (KR)

(73) Assignees: Samsung Electronics Co., Ltd., Gyeonggi-do (KR); Ewha University-Industry Collaboration Foundation, Seoul (KR)

( * ) Notice: Subject to any disclaimer, the term of this patent is extended or adjusted under 35 U.S.C. 154(b) by 253 days.

(21) Appl. No.: 14/937,989

(22) Filed: Nov. 11, 2015

(65) Prior Publication Data
US 2016/0147587 A1    May 26, 2016

Related U.S. Application Data

(60) Provisional application No. 62/082,701, filed on Nov. 21, 2014.

(30) Foreign Application Priority Data

May 7, 2015    (KR) ........................ 10-2015-0063622

(51) Int. Cl.
*G06F 11/00*    (2006.01)
*G06F 11/07*    (2006.01)
(Continued)

(52) U.S. Cl.
CPC ........ *G06F 11/079* (2013.01); *G06F 11/0742* (2013.01); *G06F 11/0748* (2013.01);
(Continued)

(58) Field of Classification Search
CPC ............... G06F 11/079; G06F 11/0742; G06F 11/0748; G06F 11/3024; G06F 11/34; G06F 11/3409; G06F 11/348; G06F 11/3485; G06F 11/349; G06F 11/3495; G06F 11/3644
See application file for complete search history.

(56) References Cited

U.S. PATENT DOCUMENTS 6,112,317 A    8/2000    Berc et al.
6,708,291 B1    3/2004    Kidder
(Continued)

FOREIGN PATENT DOCUMENTS

JP    05-274180    10/1993
JP    10-320237    12/1998
(Continued)

OTHER PUBLICATIONS

Jurriaan Bremer, "Intercepting System Calls on x86_64 Windows", May 15, 2012 (Year: 2012).*

*Primary Examiner* — Michael C Maskulinski
(74) *Attorney, Agent, or Firm* — Harness, Dickey & Pierce, P.L.C.

(57) ABSTRACT

In a method of analyzing a fault and/or error of an electronic system according to some example embodiments, a system call that accesses a hardware is replaced with a hooking system call including a code that executes the system call and a code that obtains monitoring information, the monitoring information including system call execution information and hardware performance information is obtained by executing the hooking system call when the hooking system call is called instead of the system call, and the monitoring information is recorded to analyze the fault/error of the electronic system based on the monitoring information.

19 Claims, 7 Drawing Sheets

(51) Int. Cl.
*G06F 11/30* (2006.01)
*G06F 11/34* (2006.01)
*G06F 11/36* (2006.01)

(52) U.S. Cl.
CPC .......... *G06F 11/3024* (2013.01); *G06F 11/34* (2013.01); *G06F 11/348* (2013.01); *G06F 11/3409* (2013.01); *G06F 11/3644* (2013.01)

(56) References Cited

U.S. PATENT DOCUMENTS

| | | |
|---|---|---|
| 7,191,445 B2 | 3/2007 | Brokish |
| 7,584,383 B2 | 9/2009 | Hopkinson |
| 7,971,100 B2 | 6/2011 | Dowling et al. |
| 2006/0288261 A1* | 12/2006 | Yuan .................. G06F 11/0715 714/48 |
| 2009/0199196 A1* | 8/2009 | Peracha ............. G06F 11/3409 718/104 |
| 2009/0307532 A1* | 12/2009 | Raber ................ G06F 11/3644 714/38.13 |
| 2012/0290718 A1* | 11/2012 | Nethercutt .......... G06F 11/3006 709/224 |
| 2014/0250335 A1 | 9/2014 | McCoy |

FOREIGN PATENT DOCUMENTS

| | | |
|---|---|---|
| JP | 2008-059402 A | 3/2008 |
| JP | 2014-016925 A | 1/2014 |
| KR | 10-0489997 B1 | 5/2005 |
| KR | 10-1222349 B1 | 1/2013 |

\* cited by examiner

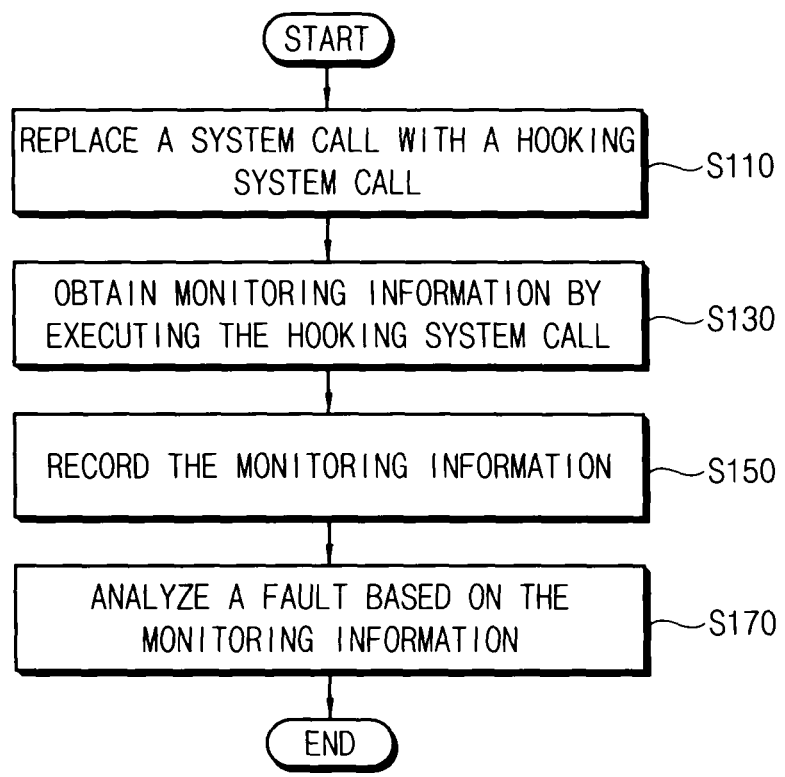

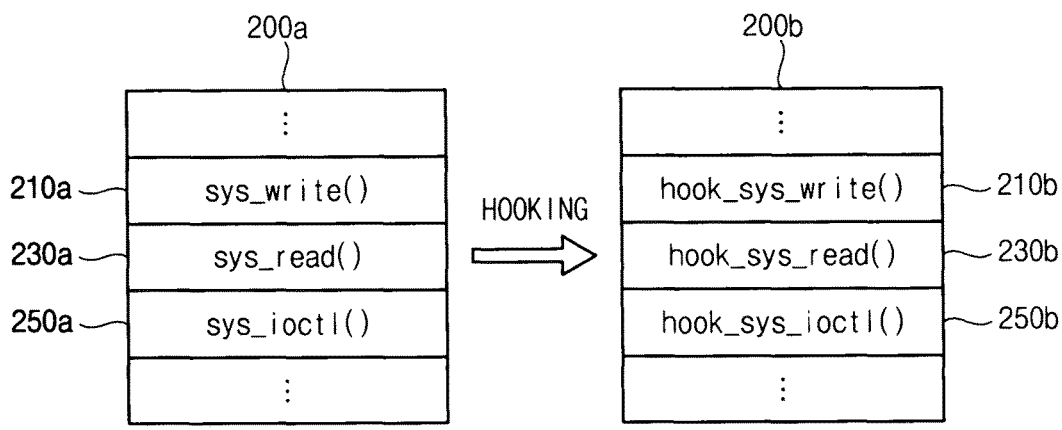

METHOD OF ANALYZING A FAULT OF AN ELECTRONIC SYSTEM

CROSS-REFERENCE TO RELATED APPLICATIONS

This U.S. non-provisional application claims the benefit of priority under 35 U.S.C. § 119 to U.S. Provisional Application No. 62/082,701 filed on Nov. 21, 2014 in the USPTO, and Korean Patent Application No. 10-2015-0063622 filed on May 7, 2015 in the Korean Intellectual Property Office (KIPO), the entire contents of each of which are incorporated by reference herein in their entireties.

BACKGROUND

1. Technical Field

Example embodiments relate generally to semiconductor device testing and, more particularly, to methods of analyzing errors and/or faults observed in electronic systems that include semiconductor devices.

2. Description of the Related Art

In an electronic system, such as a mobile system-on-chip (SoC), a fault that causes data corruption or data loss may occur due to the occurrence of certain conditions, such as if the electronic system is subjected to high temperature conditions, a hardware margin is insufficient, or a voltage fluctuation occurs, etc. When the fault occurs, it is difficult to determine whether this fault is a software fault or a hardware fault. Further, even if the fault is determined to be a hardware fault, it is also difficult to determine which hardware component, device, or the like, was the source of the fault.

SUMMARY

Some example embodiments provide a method of analyzing a fault of an electronic system.

According to some example embodiments, a method of analyzing an electronic system is provided. In the method, a system call that accesses hardware is replaced, using at least one processor, with a hooking system call including a code that executes the system call and a code that obtains monitoring information, the monitoring information including system call execution information and hardware performance information is obtained by executing the hooking system call when the hooking system call is called instead of the system call, the monitoring information is recorded to analyze the monitoring information to determine the fault/error of the electronic system.

In some example embodiments, to replace the system call with the hooking system call, the hooking system call may be written over the system call in a system call table managed by an operating system of the electronic system.

In some example embodiments, the code for obtaining the monitoring information may include a code that obtains the hardware performance information before the execution of the system call and a code that obtains the hardware performance information after the execution of the system call.

In some example embodiments, the system call execution information may include at least one of an identification of a central processing unit (CPU), an identification of a process that calls the system call, a type of the system call, a parameter of the system call, a return value of the system call, an error type of the system call and a call stack of the system call, and information regarding the contents of memory.

In some example embodiments, the hardware performance information may include at least one of a CPU cycle, a cache access count, a cache miss ratio, a stall counter and an error counter.

In some example embodiments, the recording may record the monitoring information in a log file, and the analyzing analyzes the monitoring information recorded in the log file using a monitor system.

In some example embodiments, the recording may include transferring the recorded monitoring information to a monitor system in substantially real time, and the analyzing includes transferring to and monitoring the recorded monitoring information by the monitoring system in substantially real time.

In some example embodiments, the analyzing may include classifying the fault of the electronic system as a software fault/error or a hardware fault/error based on at least one of a parameter of the system call, a return value of the system call and an error type of the system call included in the system call execution information.

In some example embodiments, the analyzing may include determining whether the fault of the electronic system is a fault of a CPU included in the electronic system or a fault of another hardware component included in the electronic system based on the system call execution information and the hardware performance information when the fault of the electronic system is classified as the hardware fault.

In some example embodiments, the analyzing may include determining that the fault of the electronic system is the fault of the CPU when the hardware performance information indicates that a performance of the CPU is not degraded and when the system call execution information indicates that the CPU executing the system call is switched.

In some example embodiments, the analyzing may include determining that the fault of the electronic system is the fault of the another hardware component when the system call execution information indicates that the CPU executing the system call is not switched, and the hardware performance information indicates that a performance of the CPU is not degraded.

In some example embodiments, the analyzing may include determining that the fault of the electronic system is the fault of the another hardware component when the system call execution information indicates that the CPU executing the system call is not switched, the hardware performance information indicates that a performance of the CPU is degraded, and that a retry or a stall occurs.

In some example embodiments, the analyzing may include determining that the fault of the electronic system is the fault of the CPU when the system call execution information indicates that the CPU executing the system call is not switched, the hardware performance information indicates that a performance of the CPU is degraded, that a retry or a stall occurs, and that an error in data transferred between the CPU and the another hardware component did not occur.

In some example embodiments, the analyzing may include determining that the fault of the electronic system is the fault of the CPU or the fault of the another hardware component based on an error counter included in the hardware performance information when the system call execution information indicates that the CPU executing the system call is not switched, the hardware performance information indicates that a performance of the CPU is degraded, that a retry or a stall did not occur, and that an error in data transferred between the CPU and the another hardware occurred.

According to some example embodiments, a method of analyzing a fault of an electronic system is provided. In the method, a system call that accesses hardware is replaced, using at least one processor, with a hooking system call including a code that executes the system call and a code that obtains monitoring information, the monitoring information including system call execution information and hardware performance information is obtained by executing the hooking system call when the hooking system call is called instead of the system call, the monitoring information is recorded in a log file, and the fault of the electronic system is analyzed based on the monitoring information recorded in the log file.

According to some example embodiments, a method for monitoring the performance of an electronic system may include executing, using at least one processor, at least one hooking system call associated with an operating system of the electronic system, the at least one hooking system call including electronic system monitoring computer readable instructions and system call computer readable instructions, monitoring, using the at least one processor, at least one interface between at least two components by generating monitoring information based on the performance of the electronic system, analyzing the generated monitoring information, the analyzing including determining whether an error has occurred at the at least one interface.

In some example embodiments, the at least two components may include at least one of a processor configured to act as a software layer and a hardware component.

In some example embodiments, the processor may be configured to act as a software layer includes at least one of a processor configured to execute an application framework, a file system, a core operating system, and a device driver.

In some example embodiments, the hardware component may include at least one of an L1 data cache, an L1 instruction cache, an L2 cache, and a main memory.

In some example embodiments, the method may include transmitting the generated monitoring information via a data packet, and the analyzing is performed by a monitoring system.

As described above, the method of analyzing the fault of the electronic system according to some example embodiments may efficiently analyze hardware and/or software faults without dedicated hardware for detecting/analyzing the faults by obtaining monitoring information including system call execution information and hardware performance information when a system call is executed.

BRIEF DESCRIPTION OF THE DRAWINGS

The foregoing and other features of inventive concepts will be apparent from the more particular description of non-limiting example embodiments of inventive concepts, as illustrated in the accompanying drawings in which like reference characters refer to like parts throughout the different views. The drawings are not necessarily to scale, emphasis instead being placed upon illustrating principles of inventive concepts. In the drawings:

FIG. 1 is a flowchart illustrating a method of analyzing a fault of an electronic device according to some example embodiments.

FIG. 2 is a diagram for describing an example where a system call is replaced with a hooking system call in a fault/error analysis method according to some example embodiments.

FIG. 3 is a diagram illustrating an example of a hooking system call used in a fault/error analysis method according to some example embodiments.

DETAILED DESCRIPTION

Figure 4:
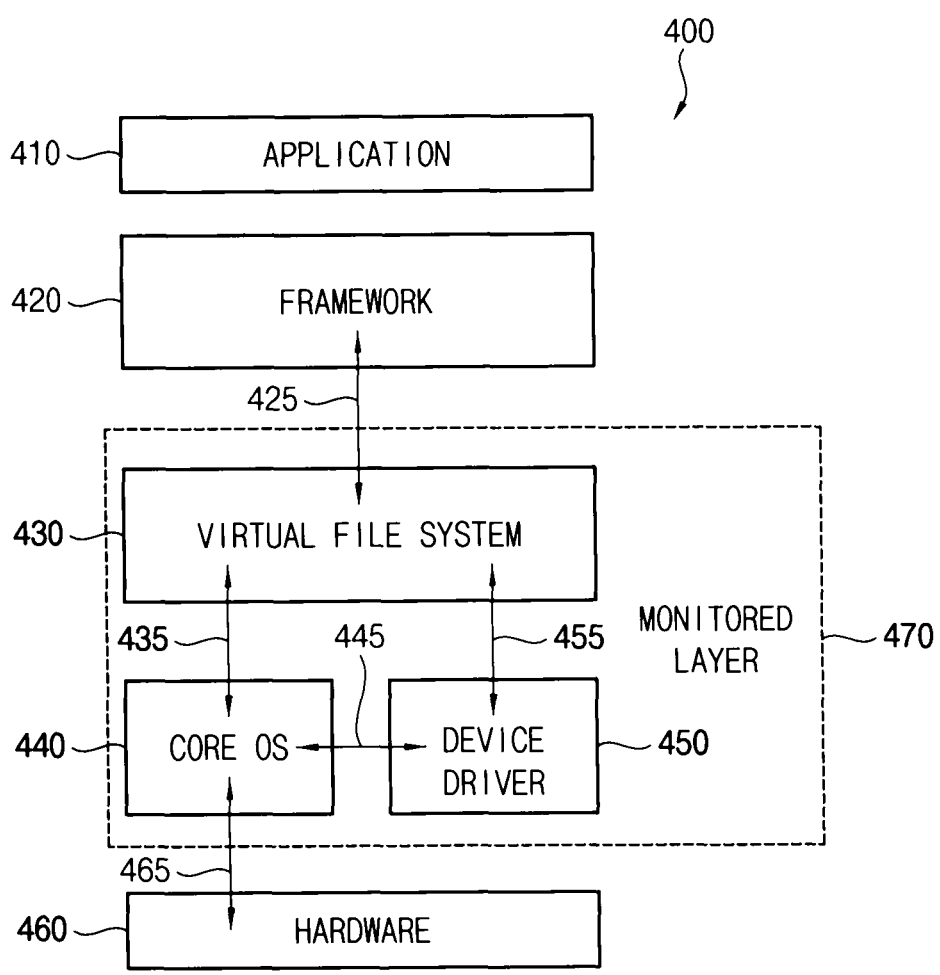
FIG. 4 is a diagram for describing software layers that are monitored by a fault/error analysis method according to some example embodiments.

Various example embodiments will be described more fully hereinafter with reference to the accompanying drawings, in which some example embodiments are shown. The present inventive concepts may, however, be embodied in many different forms and should not be construed as limited to the example embodiments set forth herein. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present inventive concepts.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the descriptive term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present inventive concepts. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concepts belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a flowchart illustrating a method of analyzing a fault of an electronic device according to some example embodiments, and FIG. 2 is a diagram for describing an example where a system call is replaced with a hooking system call in a fault/error analysis method according to some example embodiments.

Referring to FIG. 1, in a method of analyzing a fault and/or error of an electronic system according to some example embodiments, a system call that accesses hardware may be replaced (or substituted) with a hooking system call such that the hooking system call is called instead of the system call (S110). The electronic system may be any electronic system of which the fault is analyzed. In some example embodiments, the electronic system may be a mobile system-on-chip (SoC). In other example embodiments, the electronic system may be any computing system, such as a mobile phone, a smart phone, a tablet computer, a wearable electronic device, a personal computer (PC), a server computer, a workstation, a personal digital assistant (PDA), a portable multimedia player (PMP), a digital camera, a music player, a portable game console, a navigation system, network switches/routers, other networking devices, etc., as well as any other system or device that includes a semiconductor processing device.

In some example embodiments, to replace the system call with the hooking system call, the hooking system call may be written over the system call in a system call table managed by an operating system of the electronic system. For example, as illustrated in FIG. 2, a system call table 200a may initially contain original system calls 210a, 230a and 250a (or pointers of the original system calls 210a, 230a and 250a). The system call table 200a may contain any number of original system calls, however only original system calls 210a, 230a and 250a are shown for the sake of clarity and brevity. To replace the original system calls 210a, 230a and 250a with corresponding hooking system calls 210b, 230b and 250b, the hooking system calls 210b, 230b and 250b (or pointers of the hooking system calls 210b, 230b and 250b) may be written at locations of the corresponding original system calls 210a, 230a and 250a (or the pointers of the original system calls 210a, 230a and 250a) in the system call table 200a such that the system call table 200b contains the hooking system calls 210b, 230b and 250b (or the pointers of the hooking system calls 210b, 230b and 250b). In some example embodiments, this replacement may be referred to as "hooking" or "instrumentation".

In some example embodiments, among system calls stored in the system call table 200a and 200b, the systems calls 210a, 230a and 250a that access at least one hardware component, element, and/or device (e.g., a memory, a storage device, an input/output device, etc.; hereinafter referred to as "hardware component") included in the electronic system may be replaced with the hooking system calls 210b, 230b and 250b. For example, in the system call table 200a and 200b, the hooking system call 210b of 'hook_sys_write( )' may be written over the system call 210a of 'sys_write( )', by, for example, overwriting the pointer of the system call 210(a) of 'sys_write( )' with the pointer of the hooking system call 210b of 'hook_sys_write( )', (the pointer of) the hooking system call 230b of 'hook_sys_read( )' may be written over (the pointer of) the system call 230a of 'sys_read( )', (the pointer of) the hooking system call 250b of 'hook_sys_ioctl( )' may be written over (the pointer of) the system call 250a of 'sys_ioctl( )'. Before this replacement of the system calls 210a, 230a and 250a with the hooking system calls 210b, 230b and 250b, if a process (e.g., a user process) calls a system call (or a kernel function corresponding to the system call), a kernel of the operating system may call the system call 210a, 230a and 250a by referring to the system call table 200a. However, after the system calls 210a, 230a and 250a are replaced with the hooking system calls 210b, 230b and 250b, if the process calls the system call, the kernel of the operating system calls the hooking system calls 210b, 230b and 250b instead of the system call 210a, 230a and 250a by referring to the modified system call table 200b.

In other example embodiments, to replace the system call with the hooking system call, a hooking system call table that contains (the pointer of) the hooking system call may be generated, and the system call table may be replaced with the hooking system call table such that the kernel of the operating system refers to the hooking system call table instead of the hooking system call table.

The hooking system call may include code (e.g., computer readable instructions, program instructions, program code, etc.) for executing the system call (i.e., the original system call) and code for obtaining monitoring information, and may be called instead of the system call. Accordingly, when the hooking system call is called instead of the system call, the system call may be executed by the code for executing the system call, and also the monitoring information including system call execution information and hardware performance information may be obtained by the code for obtaining the monitoring information (S130). That is, by executing the hooking system call, not only information (i.e., the code for obtaining monitoring information) about the execution of the system call but also information (i.e. the hardware performance information) about a performance of a hardware component (e.g., a central processing unit (CPU), a memory, a storage device, an input/output device, etc.) included in the electronic system may be collected.

In some example embodiments, the system call execution information obtained by the hooking system call may include at least one of an identification (ID) of the CPU, an ID of a process that calls the system call, a type of the system call, a parameter of the system call, a return value of the system call, an error type of the system call (e.g., error information, exception information, fault information, etc.), a call stack of the system call, information regarding the contents of memory, etc. For example, the electronic system may include a plurality of CPUs (or a plurality of CPU cores), and the ID of the CPU included in the system call execution information may indicate which one of the CPUs executes the system call. The ID of the process included in the system call execution information may indicate which one of a plurality of processes that are currently running on the electronic system calls the system call. The type of the system call included in the system call execution information may indicate which one of a plurality of system calls (e.g., sys_write( ), sys_read( ), sys_ioctrl( ), etc.) is called. The parameter of the system call included in the system call execution information may be at least one parameter provided by the process when the process calls the system call, and, for example, may include an ID of a hardware component that is accessed by the system call, an address and a memory size, etc. The return value of the system call included in the system call execution information may be a return value that the system call returns to the hooking system call after the execution of the system call is completed. The error type of the system call included in the system call execution information may include a value of a variable (e.g., 'errno') representing an error type. For example, the hooking system call may obtain the value of the variable representing the error type when the return value of the system call indicates the error. The call stack of the system call included in the system call execution information may be a stack data structure including information about subroutines that call the system call. The information regarding the contents of memory included in the system call execution information may include information in the registers, cache, RAM, etc., associated with the system call, electronic system, and/or hardware component.

The hardware performance information may be obtained by using a hardware performance counter (or special-purpose registers included in a processor) included in the electronic system. In some example embodiments, the hardware performance information may include at least one of a CPU cycle, a cache access count, a cache miss ratio, a stall counter, an error counter, etc. For example, the CPU cycle included in the hardware performance information may be the number of clock cycles of the CPU during the execution of the system call. The cache access count included in the hardware performance information the number of times that a cache (e.g., an L1 data cache, an L1 instruction cache, an L2 cache, etc.) is accessed during the execution of the system call. The cache miss ratio included in the hardware performance information may be a ratio of the number of cache misses to the number of cache accesses during the execution of the system call. The stall counter included in the hardware performance information may represent the number of times that stalls occur in the CPU during the execution of the system call. The error counter included in the hardware performance information may represent the number of errors that occur during the execution of the system call.

FIG. 3 is a diagram illustrating an example of a hooking system call used in a fault/error analysis method according to some example embodiments.

Referring to FIG. 3, a hooking system call 300 of 'hook_sys_write( )' replacing an original system call of 'sys_write( )' may include a code 310 that executes the original system call of 'sys_write( )', and a code 330 and 335 that obtains the monitoring information including the hardware performance information and/or the system call execution information. Accordingly, once the hooking system call 300 is executed, the original system call may be executed by the code 310 for executing the original system call, and the monitoring information including the hardware performance information and/or the system call execution information may be obtained by the code 330 and 335 for obtaining the monitoring information. The code 330 and 335 for obtaining the monitoring information may obtain the hardware performance information using a hardware performance counter.

In some example embodiments, the hooking system call 300 may include, as the code 330 and 335 for obtaining the monitoring information, a code 330 that obtains the hardware performance information before the execution of the original system call, and a code 335 that obtains the hardware performance information before the execution of the original system call. Thus, compared with a method that obtains the hardware performance information at regular time intervals, the fault/error analysis method according to some example embodiments may more efficiently obtain the monitoring information for fault/error analysis by obtaining the monitoring information including the hardware performance information only when (before and/or after) the system call that accesses the hardware included in the electronic system is executed. In some example embodiments, the hooking system call 300 may further include a code 350 that records the obtained monitoring information.

FIG. 4 is a diagram for describing software layers that are monitored by a fault/error analysis method according to some example embodiments.

FIG. 4 illustrates a software hierarchy 400 of the electronic system, which includes at least one software layer 470 that is monitored by the fault/error analysis method according to some example embodiments. In some example embodiments, as illustrated in FIG. 4, the hierarchy 400 of the electronic system may include an application layer 410, a framework layer 420, a virtual file system layer 430, a core operating system (OS) layer 440, a device driver layer 450 and/or a hardware layer 460. In some example embodiments, among these layers 410, 420, 430, 440, 450 and 460 of the electronic system, the virtual file system layer 430, the core OS layer 440 and the device driver layer 450 may be monitored by the hooking system call to generate the monitoring information. In some example embodiments, by the hooking system call, a point (e.g., interface) 425 between the framework layer 420 and the virtual file system layer 430, a point 435 between the virtual file system layer 430 and the core OS layer 440, a point 445 between the core OS layer 440 and the device driver layer 450, a point 455 between the virtual file system layer 430 and the device driver layer 450, and/or a point 465 between the core OS layer 440 and the hardware layer 465 may be further monitored to generate the monitoring information. Although FIG. 4 illustrates an example of the hierarchy 400 of the electronic system, the electronic system may not be limited thereto, and may have different hierarchies according to other example embodiments, such as having more or less layers in those other example embodiments.

Figure 5:
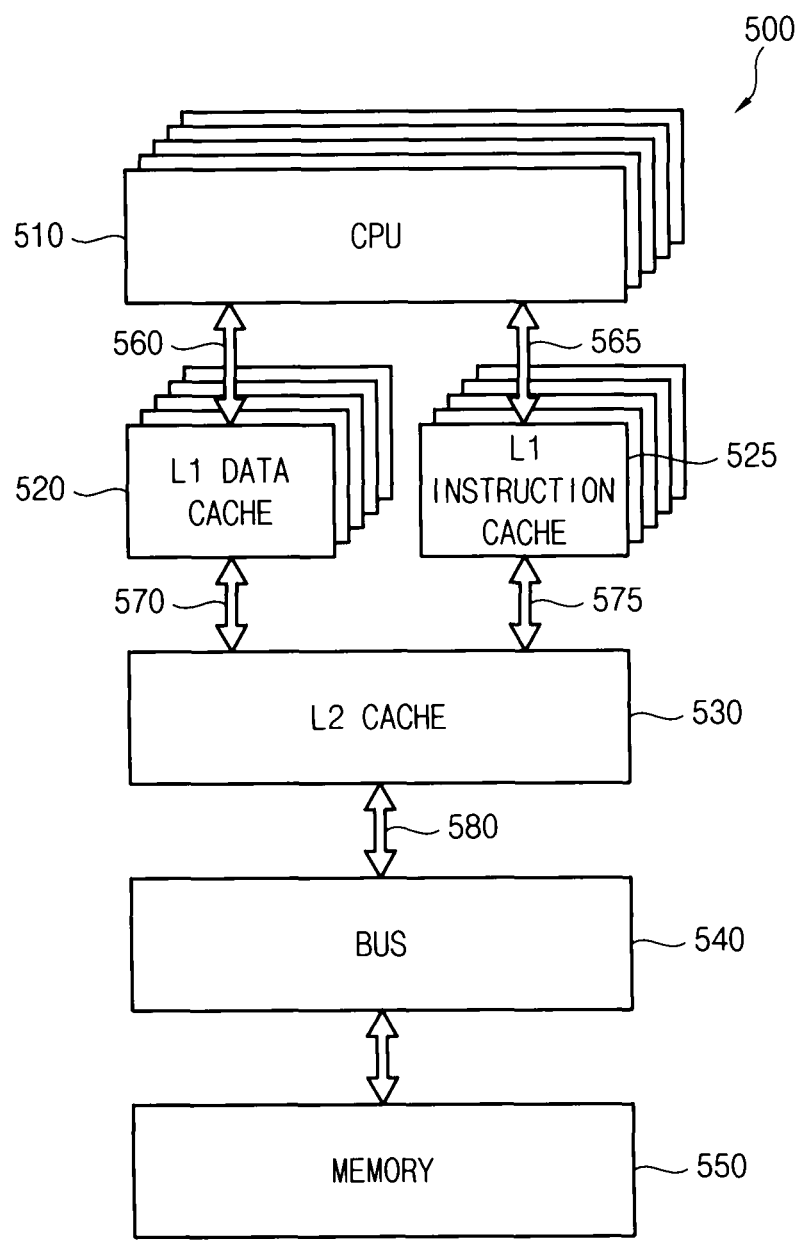
FIG. 5 is a diagram for describing locations at which hardware performance information is collected by a fault/error analysis method according to some example embodiments.

FIG. 5 is a block diagram for describing locations at which hardware performance information is collected by a fault/error analysis method according to some example embodiments.

Referring to FIG. 5, the electronic system 500 may include one or more CPUs 510 (and/or one or more CPU cores), one or more L1 data caches 520 respectively coupled to the CPUs 510, one or more L1 instruction caches 525 respectively coupled to the CPUs 510, at least one L2 cache 530 coupled to the L1 data caches 520 and the L1 instruction caches 525, and a main memory 550 coupled to the L2 cache 530 via a bus 540. For example, by using the hardware performance counter, the hardware performance information may be measured or monitored at one or more points 560 (e.g., interfaces) between the CPUs 510 and the L1 data caches 520, one or more points 565 between the CPUs 510 and the L1 instruction caches, one or more points 570 between the L1 data caches 520 and the L2 cache 530, one or more points 575 between the L1 instruction caches 525 and the L2 cache 530, and/or one or more points 580 between the 530 and the bus 540. Although FIG. 5 illustrates an example of the hardware architecture of the electronic system 500, the electronic system may not be limited thereto, and may have different architectures according to other example embodiments, such as having more or less structures/components in those other example embodiments (e.g., having additional levels of cache, adding RAM to the monitoring points, adding video/graphics processing devices, audio/sound processing devices, and/or network processing devices to the monitoring points, etc.).

Referring again to FIG. 1, the monitoring information obtained by the hooking system call may be recorded to analyze the fault and/or error of the electronic system based on the recorded monitoring information (S150). In some example embodiments, the monitoring information may be recorded in a log file, which is provided to a desired monitor system, and the monitor system may analyze the fault/error of the electronic system based on the monitoring information recorded in the log file. In other example embodiments, the recorded monitoring information may be transferred to the monitor in (substantially) real time, and the monitor system may analyze the fault/error of the electronic system (e.g., in substantially real time) based on the monitoring information transferred in real time. Additionally, the monitoring system may analyze the fault/error of the electronic system off-line and/or after the execution of the system calls.

Figure 6:
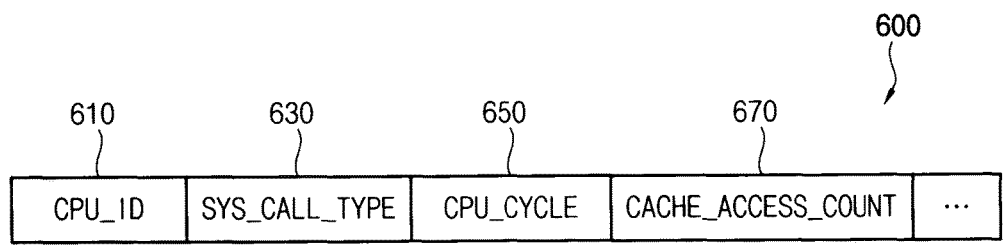
FIG. 6 is a diagram for describing an example of monitoring information that is recorded by a fault/error analysis method according to some example embodiments.

FIG. 6 is a diagram for describing an example of monitoring information that is recorded by a fault/error analysis method according to some example embodiments.

FIG. 6 illustrates an example of the recorded monitoring information 600 including, as the system call execution information, a CPU ID 610 and a system call type 630, and further including, as the hardware information, a CPU cycle 650 and a cache access count 670. In some example embodiments, the recorded monitoring information 600 may further include, as the system call execution information, a process ID, a system call parameter, a system call return value, a system call error type (e.g., error information, exception information, fault information, etc.), a system-call callstack, information regarding the contents of memory, etc. In some example embodiments, the recorded monitoring information 600 may further include, as the hardware information, a cache miss ratio, a stall counter, an error counter, etc.

For example, the CPU ID 610 may indicate which one of a plurality of CPUs included in the electronic system executes the system call, and the system call type 630 may indicate which one of a plurality of system calls (e.g., 'sys_write( )', 'sys_read( )', 'sys_ioctrl( )', etc.) is called. The process ID may indicate which one of a plurality of processes that are currently running on the electronic system calls the system call. Further, for example, the CPU cycle 650 may represent the number of clock cycles of the CPU during the execution of the system call, and the cache access count 670 may represent the number of times that a cache (e.g., an L1 data cache, an L1 instruction cache, an L2 cache, etc.) is accessed during the execution of the system call.

Referring again to FIG. 1, the fault and/or error of the electronic system may be analyzed based on the recorded monitoring information (S170). In some example embodiments, the monitor system that receives the monitoring information in the form of the log file or the (substantially) real-time data stream (or network data packet) may analyze the fault/error of the electronic system based on the monitoring information. For example, the monitor system may classify the fault/error of the electronic system as a software fault/error or a hardware fault/error, and, in case of the hardware fault/error, may determine which one (or more) of hardware components included in the electronic system is the cause of the fault/error. In some example embodiments, the electronic system of which the fault/error is analyzed and the monitor system which analyzes the fault/error may be the same computing system. In this case, the electronic system may collect its monitoring information, and then may serve as the monitor system. In other example embodiments, the electronic system and the monitor system may be separate computing systems, or devices, communicating over a wired connection, a wireless connection, a computer network, etc.

Figure 7:
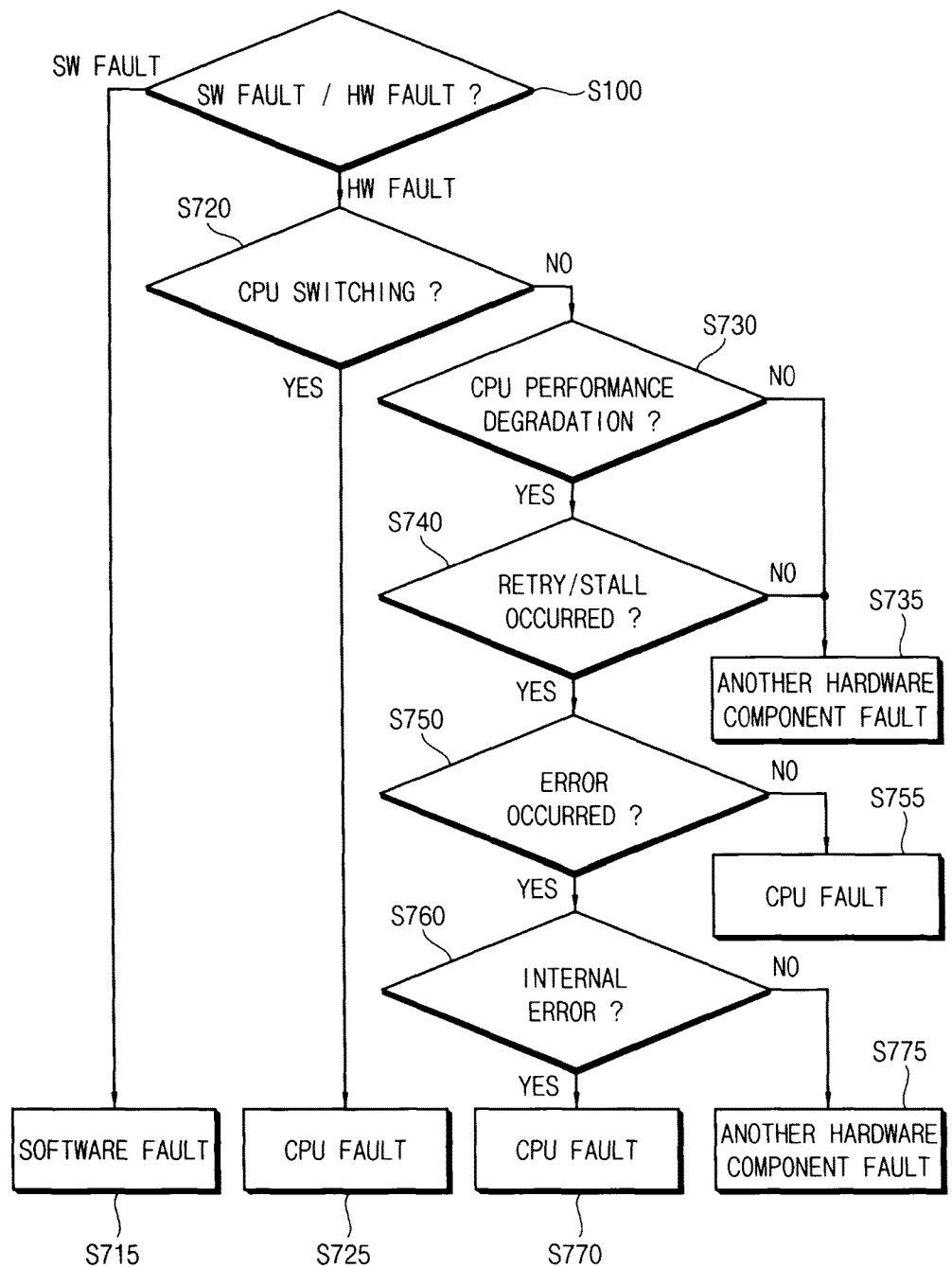
FIG. 7 is a flowchart for describing an example where a cause of a fault is analyzed by a fault/error analysis method according to some example embodiments.

FIG. 7 is a flowchart for describing an example where a cause of a fault and/or error is analyzed by a fault/error analysis method according to some example embodiments.

Referring to FIG. 7, the monitor system may classify the fault/error of the electronic system as the software fault/error or the hardware fault/error (S710). For example, the monitor system may classify the fault/error of the electronic system as the software fault/error or the hardware fault/error based on at least one of the system call parameter, the system call return value and the system call error type included in the system call execution information. If the fault and/or error is classified as the software fault/error (S710: SW FAULT, S715), the monitor system may report that the fault/error occurs in which one of the processes based on the system call execution information (e.g., the process ID included in the system call execution information).

If the fault and/or error is classified as the hardware fault/error (S710: HW FAULT), the monitor system may determine, based on the system call execution information and the hardware performance information, whether the fault/error of the electronic system is a fault/error of a CPU included in the electronic system or a fault/error of another hardware (e.g., a cache memory, a main memory, a graphic processing unit (GPU), a power management unit (PMU), an input/output device, etc.) included in the electronic system (S720, S730, S740, S750, S760).

In some example embodiments, when the system call execution information indicates that the CPU executing the system call is switched (S720: YES), the monitor system may decide that the fault and/or error of the electronic system is the fault/error of the CPU (S725). For example, the monitor system may determine the CPU switching based on the CPU ID included in the system call execution information. In some example embodiments, the monitor system may further determine, based on the hardware performance information, whether a performance of the CPU is degraded. In this case, the monitor system may decide that the fault/error of the electronic system is the fault/error of the CPU when the CPU switching occurs while the performance of the CPU is not degraded.

When the system call execution information indicates that the CPU executing the system call is not switched (S720: NO), and the hardware performance information indicates that the performance of the CPU is not degraded (S730: NO), the monitor system may decide that the fault/error of the electronic system is the fault/error of another hardware component (S735). For example, the monitor system may determine the degradation of the performance of the CPU based on the CPU cycle included in the hardware performance information.

When the system call execution information indicates that the CPU executing the system call is not switched (S720: NO), and the hardware performance information indicates that the performance of the CPU is degraded (S730: YES) and that a retry or a stall occurs (S740: NO), the monitor system may decide that the fault/error of the electronic system is the fault/error of another hardware component (S735). Here, the retry may represent that the CPU reties an execution or process, and the stall may represent that the execution or process of the CPU stops and/or waits for a previous execution or process. For example, the occurrence of the retry and/or the stall may be determined based on the cache access count, the cache miss ratio and/or the stall counter included in the hardware performance information, etc.

When the system call execution information indicates that the CPU executing the system call is not switched (S720: NO), and the hardware performance information indicates that the performance of the CPU is degraded (S730: YES), that the retry or the stall occurs (S740: YES), and that an error in data transferred between the CPU and the another hardware does not occur (S750: NO), the monitor system may determine the fault/error of the electronic system as the fault/error of the CPU (S755). For example, the occurrence of the error in the data transferred between the CPU and another hardware component may be determined based on the error counter included in the hardware performance information and/or the error type included in the system call execution information.

When the system call execution information indicates that the CPU executing the system call is not switched (S720: NO), and the hardware performance information indicates that the performance of the CPU is degraded (S730: YES), that the retry or the stall does not occur (S740: YES), and that the error in the data transferred between the CPU and the another hardware occurs (S750: YES), the monitor system may determine the fault/error of the electronic system as the fault/error of the CPU or the fault/error of another hardware component according to whether the error is an internal error of the CPU (S760, S770, S775). For example, whether the fault/error of the electronic system is an internal error of the CPU may be determined based on the error counter included in the hardware performance information. In a case where the error counter is increased, the error may be determined as not the internal error of the CPU (S760: NO). In another case where the error counter is not increased, the error may be determined as the internal error of the CPU (S760: YES). When the error is determined as the internal error of the CPU (S760: YES), the monitor system may determine the fault as the fault of the CPU (S770). When the error is determined as not the internal error of the CPU (S760: NO), the monitor system may determine the fault/error as the fault/error of another hardware component (S775).

To detect and/or analyze a fault and/or error, a typical electronic system should include dedicated hardware components/circuitry for monitoring the overall data flow at a bus where data are exchanged between hardware components. In this case, a cost may be increased due to the dedicated hardware components/circuitry. Further, in some electronic systems, it is not easy to locate the dedicated hardware component/circuitry at the bus. Alternatively, or additionally, there could be a software method that records the entire execution information for the fault/error detection. However, this software fault detection method may have an overhead for recording the entire execution information, may have a lower and/or reduced accuracy, and may not determine which one (or more) of the hardware components is the cause of the fault/error. However, the method of analyzing the fault/error of the electronic system according to some example embodiments may obtain the monitoring information including the system call execution information and the hardware performance information by replacing the system call with the hooking system call. Thus, the method of analyzing the fault of the electronic system according to some example embodiments may obtain the monitoring information without the dedicated hardware for the fault/error detection, and may efficiently detect and/or analyze the hardware and/or software faults/errors by obtaining the monitoring information only when (before and/or after) the system call that accesses the hardware is executed. Further, in a case where the fault/error is the hardware fault/error, the method of analyzing the fault/error of the electronic system according to some example embodiments can analyze the cause of the fault/error by determining whether the fault/error originates from the CPU or another hardware component.

Figure 8:
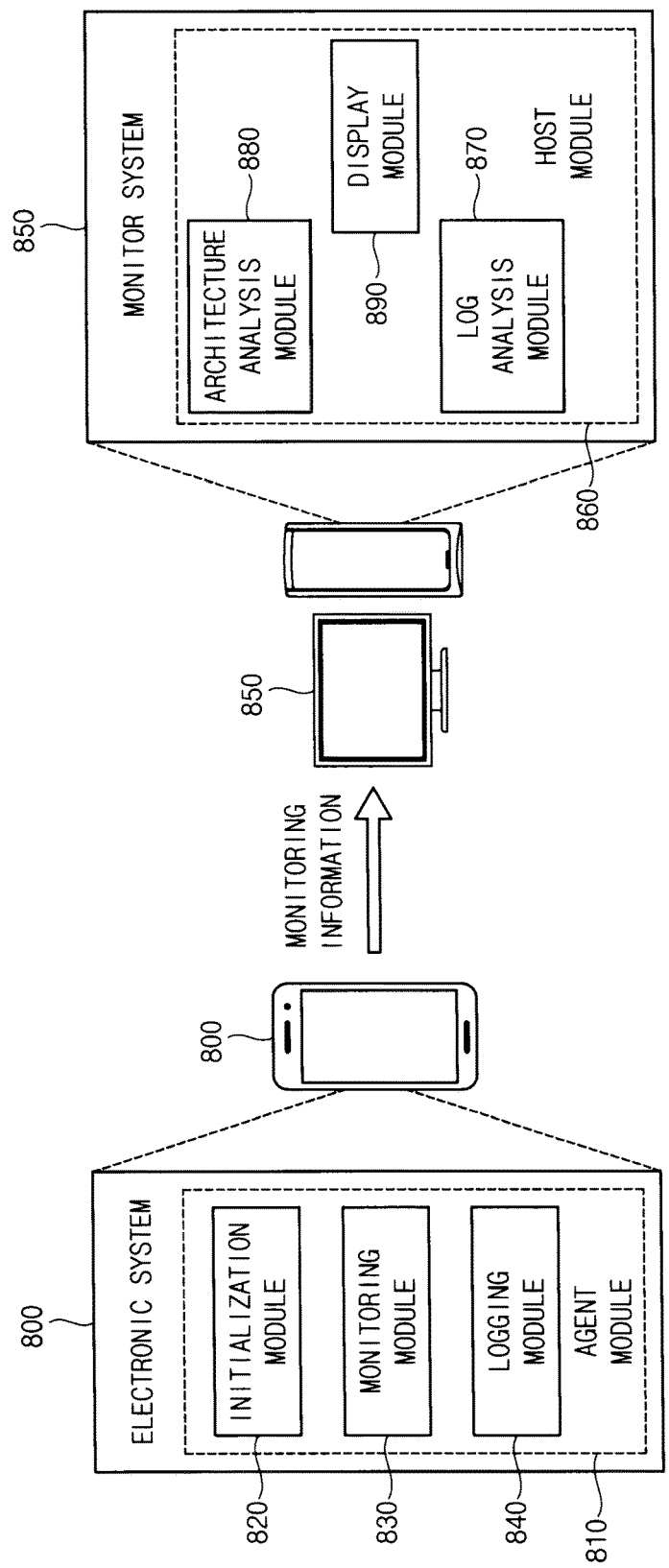
FIG. 8 is a diagram for describing an electronic system that performs a fault/error analysis method and a monitor system according to some example embodiments.

FIG. 8 is a diagram for describing an electronic system that performs a fault/error analysis method and a monitoring system according to some example embodiments.

Referring to FIG. 8, an electronic system 800 of which a fault and/or error is analyzed may execute an agent module 810 for obtaining and recording monitoring information. In some example embodiments, the electronic system 800 may be a mobile system-on-chip (SoC). In other example embodiments, the electronic system 800 may be any computing system, such as a mobile phone, a smart phone, a tablet computer, a wearable electronic device, a personal computer (PC), a server computer, a workstation, a personal digital assistant (PDA), a portable multimedia player (PMP), a digital camera, a music player, a portable game console, a navigation system, network switches/routers, other networking devices, etc. In still more example embodiments, the electronic system 800 may be any other system or device that includes a semiconductor processing device.

In some example embodiments, the agent module 810 may include an initialization module 820, a monitoring module 830, a logging module 840, etc. The initialization module 820 may replace a system call that accesses a hardware component with a hooking system call including a code (e.g., computer readable instructions, program instructions, program code, etc.) for executing the system call and a code for obtaining the monitoring information. For example, to replace the system call with the hooking system call, the initialization module 820 may write (e.g., a pointer of) the hooking system call over (e.g., a pointer of) the system call in a system call table managed by an operating system of the electronic system 800.

The monitoring module 830 may obtain the monitoring information when the hooking system call is called or executed instead of the system call. The monitoring information obtained by the monitoring module 830 may include system call execution information and hardware performance information. For example, the system call execution information may include at least one of an ID of a CPU, an ID of a process that calls the system call, a type of the system call, a parameter of the system call, a return value of the system call, an error type of the system call (e.g., error information, exception information, fault information, etc.), a call stack of the system call, information regarding the contents of memory, etc. Further, the hardware performance information may include at least one of a CPU cycle, a cache access count, a cache miss ratio, a stall counter and an error counter.

The logging module 840 may record the monitoring information obtained by the monitoring module 830. In some example embodiments, the logging module 840 may record the monitoring information in a log file, and the log file containing the monitoring information may be provided to a monitor system 850. In other example embodiments, the logging module 840 may record monitoring information in a desired network data packet, and the network data packet may be transferred to the monitor system 850 in substantially real time.

The monitor system 850 may be any computing system and/or device. In some example embodiment, the electronic system 800 of which the fault/error is analyzed and the monitor system 850 which analyzes the fault/error may be the same computing system or device. In this case, the electronic system 800 may collect its monitoring information, and then may serve as the monitor system 850. In other example embodiments, the electronic system 800 and the monitor system 850 may be separate computing systems and/or devices. The monitor system 850 may execute a host module 860 for analyzing and displaying the fault/error of the electronic system 800. The host module 860 may receive the monitoring information in the form of the log file or the network data packet from the agent module 810 of the electronic system 800.

In some example embodiments, the host module 860 may include a log analysis module 870 and a display module 890. The log analysis module 870 may analyze the fault/error of the electronic system 800 based on the monitoring information. For example, the log analysis module 870 may classify the fault/error of the electronic system 800 as a software fault/error or a hardware fault/error, and, in case of the hardware fault/error, may determine which one or more of the hardware components included in the electronic system is the cause of the fault/error. The display module 890 may display a result of the analysis by the log analysis module 870 to a user (or a developer or a designer for the electronic system 800) via a display device included in the monitor system 850, or may report the analysis result to the user with a desired electronic file.

In some example embodiments, the host module 860 may further include an architecture analysis module 880 for analyzing software and/or hardware architectures of the electronic system 800. In this case, the fault/error of the electronic system 800 may be analyzed based on the architecture of the electronic system 800 that is analyzed by the architecture analysis module 880 as well as the monitoring information, and the display module 890 may further display or report the architecture analyzed by the architecture analysis module 880 along with the analysis result by the log analysis module 870.

As described above, the electronic system 800 and the monitor system 850 performing the fault/error analysis method according to some example embodiments may efficiently analyze the hardware and/or software fault/error without the dedicated hardware for the fault/error detection by obtaining the monitoring information including the system call execution information and the hardware performance information when the system call is executed.

The inventive concepts may be applied to any system-on-chip or any computing system, such as a mobile phone, a smart phone, a tablet computer, a wearable electronic device, a personal computer (PC), a server computer, a workstation, a personal digital assistant (PDA), a portable multimedia player (PMP), a digital camera, a music player, a portable game console, a navigation system, network switches/routers, other networking devices, etc., and/or any other system or device that includes a semiconductor processing device.

The units and/or modules described herein may be implemented using hardware components, software components, or a combination thereof. For example, the hardware components may include microcontrollers, memory modules, sensors, amplifiers, band-pass filters, analog to digital converters, and processing devices, or the like. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors, multi-core processors, distributed processing, or the like.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, or computer storage medium or device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of some example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

It should be understood that example embodiments described herein should be considered in a descriptive sense only and not for purposes of limitation. Descriptions of features or aspects within each device or method according to example embodiments should typically be considered as available for other similar features or aspects in other devices or methods according to example embodiments. While some example embodiments have been particularly shown and described, it will be understood by one of ordinary skill in the art that variations in form and detail may be made therein without departing from the spirit and scope of the claims.

What is claimed is:

1. A method of analyzing an electronic system, the method comprising:
   replacing, using at least one processor, a system call that accesses a hardware component with a hooking system call including a code that executes the system call and a code that obtains monitoring information;
   obtaining, using the at least one processor, the monitoring information including system call execution information and hardware performance information by executing the hooking system call when the hooking system call is called instead of the system call;
   recording, using the at least one processor, the monitoring information; and
   analyzing, using the at least one processor, the monitoring information to determine whether a fault occurred in the electronic system, the analyzing including classifying the fault of the electronic system as a software fault or a hardware fault based on at least one of a parameter of the system call, a return value of the system call and an error type of the system call included in the system call execution information.

2. The method of claim 1, wherein the replacing comprises:
   writing, using the at least one processor, the hooking system call over the system call in a system call table managed by an operating system of the electronic system.

3. The method of claim 1, wherein the code for obtaining the monitoring information includes a code that obtains the hardware performance information before the execution of the system call and a code that obtains the hardware performance information after the execution of the system call.

4. The method of claim 1, wherein the system call execution information includes at least one of an identification of a central processing unit (CPU), an identification of a process that calls the system call, a type of the system call, a parameter of the system call, a return value of the system call, an error type of the system call, a call stack of the system call, and information regarding the contents of memory.

5. The method of claim 1, wherein the hardware performance information includes at least one of CPU cycle information including a number of clock cycles of the CPU used during execution of the system call, a cache access count, a cache miss ratio, a CPU stall counter, and a system call execution error counter.

6. The method of claim 1, wherein
   the recording records the monitoring information in a log file; and
   the analyzing analyzes the monitoring information recorded in the log file using a monitoring system.

7. The method of claim 1, wherein
   the recording comprises transferring the recorded monitoring information to a monitoring system in substantially real time; and
   the analyzing comprises transferring to and monitoring the recorded monitoring information by the monitoring system in substantially real time.

8. The method of claim 1, wherein the analyzing comprises:
   determining whether the fault of the electronic system is a fault of a CPU included in the electronic system or a fault of another hardware component included in the electronic system based on the system call execution information and the hardware performance information when the fault of the electronic system is classified as the hardware fault.

9. The method of claim 8, wherein the analyzing comprises:
   determining that the fault of the electronic system is the fault of the CPU when the hardware performance information indicates that a performance of the CPU is not degraded and when the system call execution information indicates that the CPU executing the system call is switched.

10. The method of claim 8, wherein the analyzing comprises:
    determining that the fault of the electronic system is the fault of the another hardware component when the system call execution information indicates that the CPU executing the system call is not switched, and the hardware performance information indicates that a performance of the CPU is not degraded.

11. The method of claim 8, wherein the analyzing comprises:
    determining that the fault of the electronic system is the fault of the another hardware component when the system call execution information indicates that the CPU executing the system call is not switched, the hardware performance information indicates that a performance of the CPU is degraded, and that a retry or a stall occurs.

12. The method of claim 8, wherein the analyzing comprises:
    determining that the fault of the electronic system is the fault of the CPU when the system call execution information indicates that the CPU executing the system call is not switched, the hardware performance information indicates that a performance of the CPU is degraded, that a retry or a stall occurs, and that an error in data transferred between the CPU and the another hardware component did not occur.

13. The method of claim 8, wherein the analyzing comprises:
    determining that the fault of the electronic system is the fault of the CPU or the fault of the another hardware component based on an error counter included in the hardware performance information when the system call execution information indicates that the CPU executing the system call is not switched, the hardware performance information indicates that a performance of the CPU is degraded, that a retry or a stall did not occur, and that an error in data transferred between the CPU and the another hardware occurred.

14. A method of analyzing a fault of an electronic system, the method comprising:
    replacing, using at least one processor, a system call that accesses hardware with a hooking system call, the hooking system call including a code that executes the system call and a code that obtains monitoring information;

obtaining, using the at least one processor, the monitoring information, the monitoring information including system call execution information and hardware performance information by executing the hooking system call when the hooking system call is called instead of the system call;

recording, using the at least one processor, the monitoring information in a log file; and analyzing, using the at least one processor, the fault of the electronic system based on the monitoring information recorded in the log file, the analyzing including classifying the fault of the electronic system as a software fault or a hardware fault based on at least one of a parameter of the system call, a return value of the system call and an error type of the system call included in the system call execution information.

15. A method for monitoring performance of an electronic system, comprising:

executing, using at least one processor, at least one hooking system call associated with an operating system of the electronic system, the at least one hooking system call including electronic system monitoring computer readable instructions and system call computer readable instructions;

monitoring, using the at least one processor, at least one interface between at least two components of the electronic system by generating monitoring information based on the performance of the electronic system;

analyzing, using the at least one processor, the generated monitoring information, the analyzing including classifying the fault of the electronic system as a software fault or a hardware fault based on at least one of a parameter of the system call, a return value of the system call and an error type of the system call included in the monitoring information.

16. The method of claim 15, wherein the at least two components comprise at least one of a processor configured to act as a software layer and a hardware component.

17. The method of claim 16, wherein the processor configured to act as a software layer comprises at least one of a processor configured to execute an application framework, a file system, a core operating system, and a device driver.

18. The method of claim 16, wherein the hardware component comprises at least one of an L1 data cache, an L1 instruction cache, an L2 cache, and a main memory.

19. The method of claim 15, further comprising:

transmitting the generated monitoring information via a data packet; and wherein the analyzing is performed by a monitoring system.

* * * * *